United States Patent [19]

Strunk et al.

[11] Patent Number: 5,484,652
[45] Date of Patent: Jan. 16, 1996

[54] NON-WOVEN MAT SURFACE PLY FOR WOVEN FABRIC

[75] Inventors: Louis M. Strunk, Colwich, Kans.; Anthony Bosch, El Toro; Ted Kruhmin, San Clemente, both of Calif.

[73] Assignees: Beech Aircraft Corp., Wichita, Kans.; BP Chemicals (HITCO), Inc., Gardena, Calif.

[21] Appl. No.: 216,462

[22] Filed: Mar. 22, 1994

Related U.S. Application Data

[62] Division of Ser. No. 896,184, Jun. 10, 1992, Pat. No. 5,340,520.

[51] Int. Cl.[6] ..................................................... B32B 7/00
[52] U.S. Cl. .......................... 428/251; 428/246; 428/282; 428/225; 428/408; 428/902
[58] Field of Search .................................... 428/233, 246, 428/251, 408, 902, 285, 282, 236, 229

[56] References Cited

U.S. PATENT DOCUMENTS

| | | | |
|---|---|---|---|
| 3,554,852 | 1/1971 | Sugarman et al. | 428/236 |
| 3,904,455 | 9/1975 | Goldman | 428/233 |
| 4,522,673 | 6/1985 | Fell et al. | 428/233 |
| 4,869,947 | 9/1989 | Kirayoglu | 428/408 |
| 4,999,236 | 3/1991 | McCullough et al. | 428/233 |
| 5,316,834 | 5/1994 | Matsuda et al. | 428/233 |

*Primary Examiner*—James J. Bell
*Attorney, Agent, or Firm*—Richard W. Hanes

[57] ABSTRACT

A material for smoothing the outside surface of a woven fabric composite lay up in which a layered sandwich structure is formed of continuous fiber woven material, resin films and a mat of randomly oriented discontinuous fibers and the sandwiched layers are integrated into a single sheet of resin impregnated material by application of pressure and heat.

4 Claims, 2 Drawing Sheets

NON-WOVEN MAT SURFACE PLY FOR WOVEN FABRIC

This application is a division of application Ser. No. 07/896,184 filed Jun. 10, 1992, now U.S. Pat. No. 5,340,520.

The present invention relates to method and apparatus for improving the outer ply surface smoothness of composite fibrous lay up structures.

BACKGROUND OF THE INVENTION

In the manufacture of boats, airplanes and other structures where woven fibrous materials become part of the composite skin or covering material, the economic creation of smooth finished surface has been a ubiquitous problem. Almost by definition, the woven nature of an outer ply of the composite material presents a rough and porous surface, the preparation of which is expensive and time-consuming before it is possible to apply the final coating, such as paint, especially when an aerodynamic finish is required.

The prior art has adopted several approaches to solving this problem and many of the solutions have seen use with fiber glass structures, especially in the automotive and boat industries.

One popular method of smoothing the irregularities of the woven fabric involves the use of a liquid gel-coat, sprayed onto the tool, prior to the laying down of the first layer of woven fabric. The gel-coat transfers into the woven material during processing to create a filler. The difficulty with this process however is the control of thickness and other aspects of a uniform application of the gel-coat, requiring later finishing steps, such as sanding, to rid the surface of undulations and irregularities. Another disadvantage is the added weight of the gel-coat material, a significant penalty in the aircraft industry.

Another method uses dry sheets of polyester, placed on the tool prior to application of the structural woven fiber plies. This method has not proved satisfactory because the sheets wrinkle and are difficult to control and keep in place while laying up the outer ply of the composite structure, especially when used on a tool having complex shapes.

Adhesion of smoothing materials to the woven fiber surface is also unsatisfactory and expensive. In some such systems the adhesion materials are different than the epoxy which impregnates the structural plies of woven material, creating a reaction between the two materials which alters the structural characteristics of the composite, which is a disagreeable result.

Accordingly, the primary object of the present invention is to provide a means and method of smoothing the outer ply of a woven composite structure so as to eliminate costly preparation of the surface for final finish.

More specifically, the object of the invention is to provide a smooth outer composite material surface by using a random oriented aramid, polyester, graphite or fiberglass resin impregnated mat as the outer ply for composite resin lay ups.

Another object of the invention is to provide a means for smoothing the outside surface of a woven fabric composite lay up without the additional step, either in the tool or after the molding process, of including or adding to the composite an independent or separate layer of material for smoothing purposes, but instead to unite the smoothing material with the outer ply so that the smoothing agent and the outer ply are applied together.

An additional objective of the invention is to utilize the benefits of a structurally weak non-woven material as a smoothing agent, but to combine the woven and non-woven materials so that the weaker material may be handled and applied to a tool integrally with the stronger woven material, thus protecting the physical integrity of the non-woven material.

A still further object of the invention is to provide a smoothing agent for pre-impregnated woven sheets of material which can be applied with the same epoxy as that which is used to impregnate the woven sheet, thus eliminating the problems inherent in the prior art's juxtapositioning of dissimilar epoxies.

Other and still further objects, features and advantages of the present invention will become apparent upon a reading of the following detailed description of the present invention, taken together with the accompanying drawings in which.

DESCRIPTION OF THE INVENTION

The invention is an item of manufacture and the process for making the same. The preferred form of the inventive product or apparatus comprises a ply of woven material made from continuous filaments which are combined with a resin impregnated randomly oriented fiber mat constructed of aramid, polyester, graphite, fiberglass or similar material. Although the preferred form of the invention is a product which incorporates the impregnated non-woven mat with the woven structural ply, it is also within the scope of the invention to place the impregnated non-woven mat against the tool surface during the lay up process and then lay the outer structural woven fabric down against the mat. In either case, the porosity of the mat disperses the entrapped air and volatiles which arise during the heating phase of the composite construction, thus reducing pinholes, porosity and other surface imperfections and irregularities.

DETAILED DESCRIPTION

Figure 1:
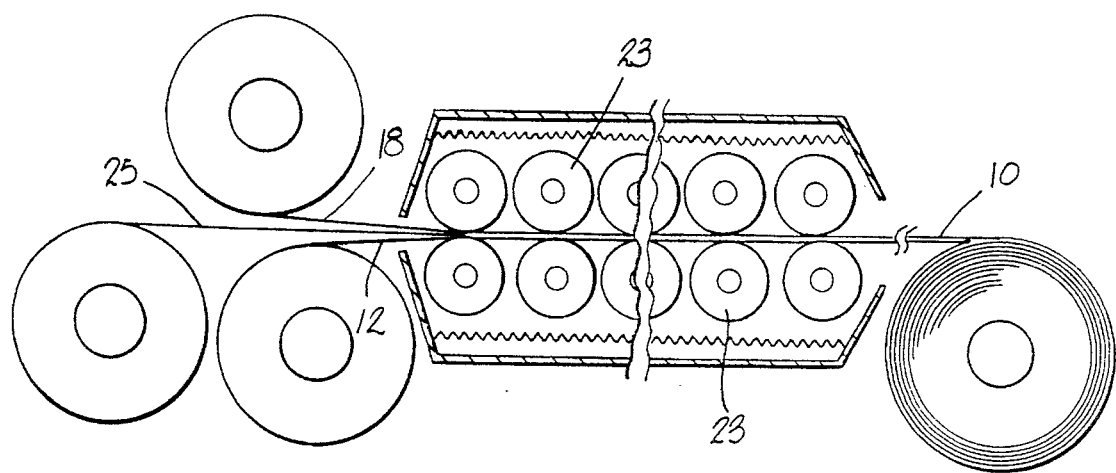
FIG. 1 is a diagrammatical side elevational view of a series of heated pressure rollers for integrating the sheets of matting and continuous fiber material with the addition of an intermediate film of resin.
Figure 2:
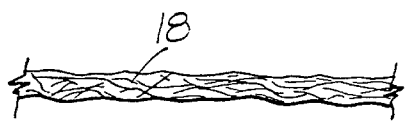
FIG. 2 is a fragmentary cross-sectional view of the randomly oriented fiber matting material.
Figure 3:
FIG. 3 is a fragmentary cross-sectional view of the resin film.
Figure 4:
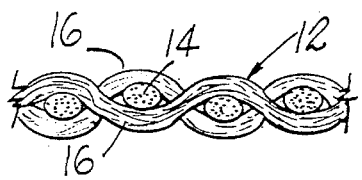
FIG. 4 is a fragmentary cross-sectional view of a woven continuous fiber fabric.
Figure 5:
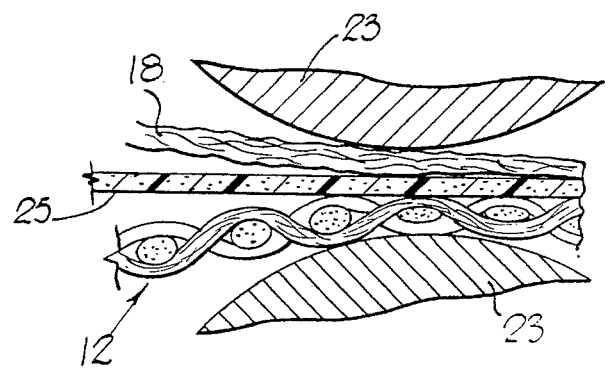
FIG. 5 is an enlarged fragmentary cross-sectional view of the matting, the resin film and the woven structure material being integrated by a heated pressure roller in the first stage of the process.
Figure 6:
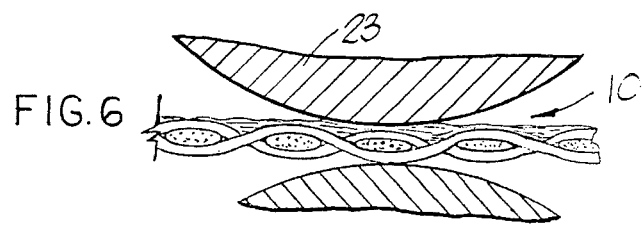
FIG. 6 is a view similar to that of FIG. 5, but showing the integrated sheet in the final stage of the integrating process.
Figure 7:
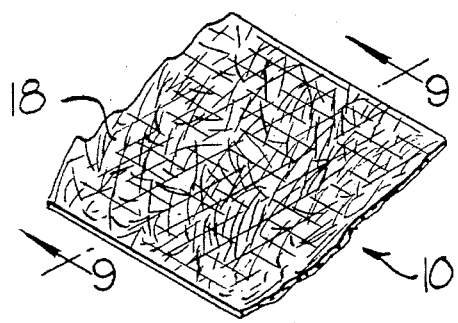
FIG. 7 is a fragmentary perspective view of the integrated sheet of the present invention.
Figure 8:
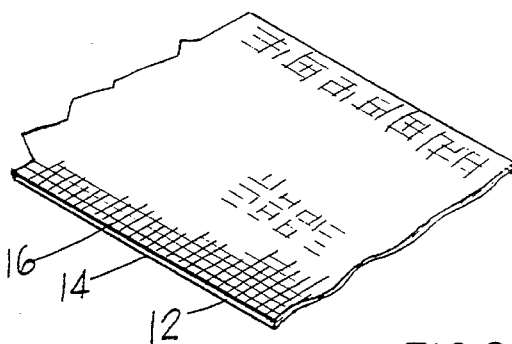
FIG. 8 is a fragmentary perspective view of the woven structural sheet to which a matting sheet is applied.
Figure 9:
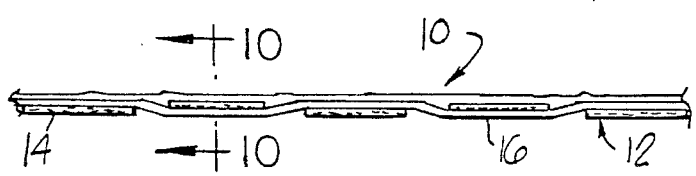
FIG. 9 is a cross-sectional view taken along lines 9—9 of FIG. 7.
Figure 10:
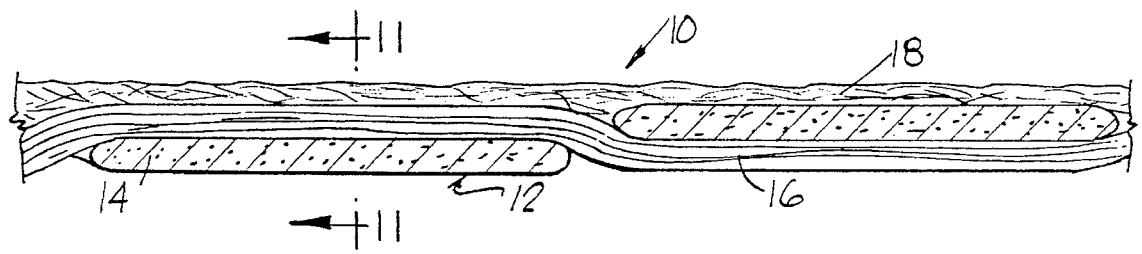
FIG. 10 is an enlarged fragmentary cross-sectional view taken along lines 10—10 of FIG. 9.
Figure 11:
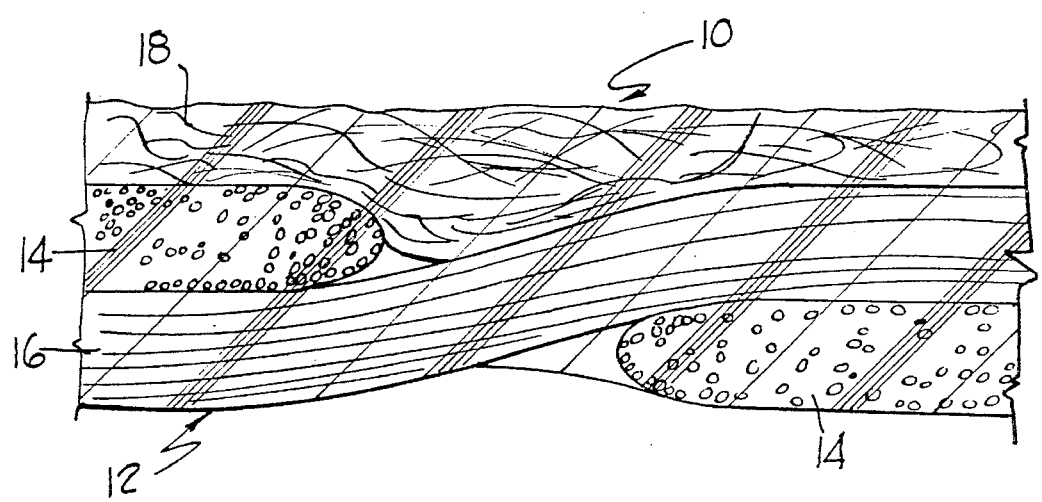
FIG. 11 is a much enlarged fragmentary cross-sectional view taken along lines 11—11 of FIG. 10 showing the total integration of the woven structural sheet and the facing random fiber mat.

The preferred embodiment of the invention is an article of manufacture which comprises two layers of material combined together face to face by a resinous boundary to form a unitary structure 10. See FIGS. 9–11.

One of the sheets 12 is a woven or non-woven resin impregnated material made up of continuous fibers, such as fiberglass or carbon filaments which has structural strength and which is intended to become the outside layer of a laid up composite skin structure of an aircraft, boat or other structure. Actually, the preferred form of the invention utilizes a sheet of woven bundles 14 and 16 of continuous carbon filaments, forming the warp and woof respectively of the fabric sheet 12.

The second sheet 18 comprises a porus pressed mat of short discontinuous and randomly oriented fibers which may by polyester, graphite, aramid, fiberglass or other material.

The two sheets are combined together with a resinous boundary to form a unitary structure which is laid down as the first or outside layer of lay up of composite sheets against a tool or mold. In the construction of composite aircraft, for example, the outer wing skin is formed by first laying up a number of superimposed sheets of woven carbon filament material which are impregnated with a resin. After the lay up, the structure is subjected to heat and pressure to integrate the various layers into a composite skin. Using the product of the present invention, the outside layer, or the one next to the tool is provided with the porus randomly oriented fiber mat which acts to disperse entrapped air and volatiles from the resin which are given off during the heating and pressurizing process. This dispersement greatly reduces pinholes, surface porosity and other imperfections which would require preparation before final finish such as painting.

Matting can be selected from a wide range of materials having various specifications of fiber length and weight but for aircraft purposes it has been found that a carbon fiber mat with randomly oriented chopped fibers of approximately ¼ inch to 1 inch long and weighing approximately 0.5 to 1.0 ounce per square yard will accomplish the objectives of the invention.

The same beneficial result can be obtained without the use of an integrated sheet, such as the one described above and shown in FIGS. 10 and 11 of the drawings. In the lay up process of the composite skin member, the mat, which can be pre-impregnated with resin or not is laid against the tool to become the first or outside layer of the composite. Against the mat are then laid the successive layers of impregnated structural strength continuous fiber material, such as, for example, the sheets of woven carbon filament bundles. The heating and pressurizing phase of the composite construction acts to integrate all of the layers of structural sheeting and the outside layer of surface matting material, producing a product which is similar to the one constructed with the integrated sheet 10. The disadvantage of the method just described, with the laying of the mat separately, is that the matting material has little structural integrity and is difficult to properly lay and retain in place over complex surfaces.

FIGS. 1–6 of the drawings illustrate one method of producing the integral continuous fiber sheet and the mat. A length of matting material 18 is fed between heated pressure rollers 23, together with a length of resin film 25 and a length of structural woven or non-woven continuous fiber material 12. The pressure and the heat provided by the rollers bond the materials together to form an integrated sheet 10.

We claim:

1. An article of manufacture comprising,
   a sheet of resin impregnated material comprising continuous fibers,
   a sheet of material comprising a randomly oriented discontinuous fiber mat combined with the sheet of resin impregnated material in face to face relation.

2. The article of claim 1 wherein the attachment of the two sheets is formed by a resin film.

3. The article of claim 2 wherein the sheet of continuous fibers comprises carbon filaments.

4. The article of claim 2 wherein the sheet of continuous fibers comprises fiberglass.

* * * * *